United States Patent [19]

Walker et al.

[11] 4,174,746
[45] Nov. 20, 1979

[54] PILE SIZER

[76] Inventors: Brooks Walker, 1280 Columbus Ave., San Francisco, Calif. 94133; James Williamson, P.O. Box 93, Tahoe City, Calif. 95730

[21] Appl. No.: 847,057

[22] Filed: Oct. 31, 1977

[51] Int. Cl.$^2$ .............................................. B27C 5/00
[52] U.S. Cl. .............................. 144/134 R; 51/241 B; 144/2 R; 82/59; 409/179
[58] Field of Search ................ 90/12 R, 15 A, 14; 144/2 R, 34 R, 134 R, 205, 2 N; 51/241 A, 241 B, 241 S

[56] References Cited

U.S. PATENT DOCUMENTS

| | | | |
|---|---|---|---|
| 1,068,861 | 7/1913 | Dersch | 51/241 B |
| 2,297,074 | 9/1942 | Rohrdanz | 51/241 B |
| 2,671,478 | 3/1954 | Anderson et al. | 144/2 N |
| 2,825,370 | 3/1958 | Fieber | 144/2 N |
| 3,009,494 | 11/1961 | Hinkley | 144/2 N |
| 4,069,624 | 1/1978 | Henry, Jr. | 51/241 B |

Primary Examiner—Robert L. Spruill
Assistant Examiner—W. D. Bray
Attorney, Agent, or Firm—Gordon Wood

[57] ABSTRACT

A pile sizer for reducing the lateral extent or diameter of the upper end of a submerged pile. A vertically extending elongated anchor rod is threadedly secured to the upper end of the submerged pile along the central axis of the latter and an elongated tube is swingably secured to said anchor rod by arms to permit orbital movement of said tube about the centerline of the pile. An elongated shaft is rotatably supported within the tube and is formed with a milling cutter at its lower end for cutting the pile and is connected at its upper end to a motor mounted on the upper end of the tube. The operation of sizing the pile to a predetermined diameter can thus be performed from above the water line.

4 Claims, 4 Drawing Figures

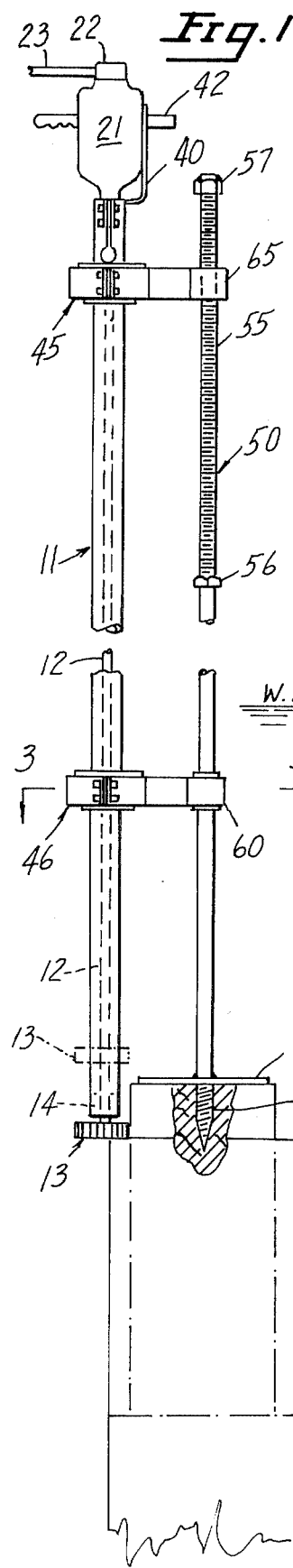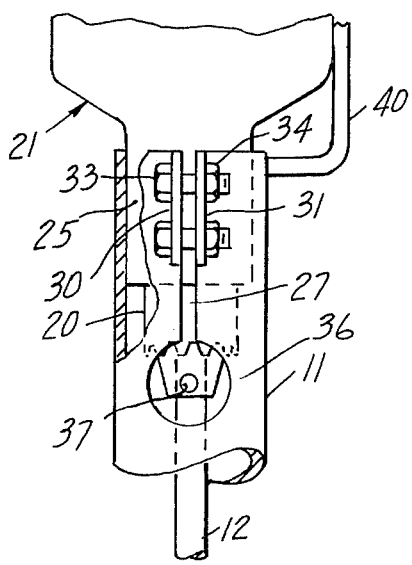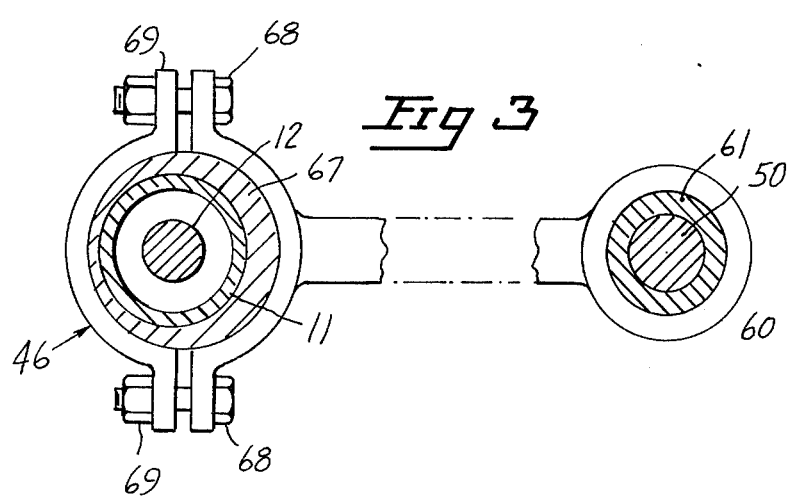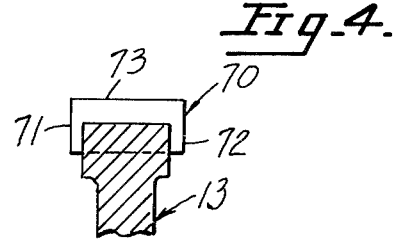

PILE SIZER

This invention relates to the repair of damaged piles and to an apparatus adapted to size the upper end of a pile which is submerged below the water level.

It is frequently necessary to replace the upper portion of a damaged pile which is above the water level since the life of the completely submerged lower portion of the pile is almost indefinite. In copending application Ser. No. 774,913, filed Mar. 7, 1977, there are disclosed various methods of replacing the upper portion of a damaged pile. One such method involves the use of a tube of predetermined internal diameter which is fitted at its lower end over the pile and which may extend at its upper end to the load to be carried or which may be provided with a smaller diameter pipe or the like acting as a replacement for the damaged upper portion of the pile. An apparatus for severing the upper damaged portion of the pile prior to the use of the present invention is disclosed in application Ser. No. 805,717, filed June 13, 1977, now abandoned.

It is desirable in many instances to replace the upper damaged portion of a pile by a steel tube of about the same diameter of the pile but preferably smaller. To this end it is necessary to reduce the lateral extent or diameter of the existing lower portion of the submerged pile and the main object of the present invention is an apparatus for performing this function.

Another object of the invention is the provision of an apparatus for sizing a wood pile, pole or the like which is below the water level so that the entire operation can be carried out by an operator above the water level.

Another object of the invention is the provision of a pile sizer which is readily adjustable to permit adjusting the radius at which the cutting step is carried out so as to provide different diameters of the sized pile, if desired.

Other objects and advantages will be apparent from the following specification and drawings.

FIG. 1 is a side elevation of the apparatus of the present invention with the central portion thereof broken away.

FIG. 2 is a greatly enlarged side elevation partly in section of the upper end of the apparatus.

FIG. 3 is a horizontal section taken substantially in a plane indicated by lines 3—3 of FIG. 1.

FIG. 4 is a fragmentary section through the periphery of the cutter showing one of the cutter blades.

In detail, and first with reference to FIG. 1, the apparatus is adapted to be employed on the upper end of a pile generally designated 10 when said upper end is below the water line indicated in FIG. 1. The invention comprises an elongated tubular member generally designated 11 in which is rotatably supported a shaft 12 to the lower end of which is secured a cutter 13. The shaft 12 may be provided with suitable bearings such as the one indicated at 14 at the lower end of tube 11 for rotatably supporting said shaft.

The upper end of shaft 12 is fixedly but releasably secured within the chuck 20 of a drill generally designated 21. The drill 21 may be conventional and may be provided with a swivel 22 for connecting an electric cord 23 to prevent twisting or tangling of the latter.

The elongated housing portion 25 (FIG. 2) of the drill 21 may be received within the upper end of tube 11 as best seen in FIG. 2. The tube 11 is provided at its upper end with an axially extending slot 27 and is formed with a pair of elongated ears 30, 31 adapted to be clamped together by bolts 33 and nuts 34 for fixedly securing the drill 21 relative to the tube 11.

At the lower end of slot 27 an opening 36 is formed in the sidewall of said tube so as to permit access with a conventional toothed wrench adapted to be rotated in hole 37 of drill chuck 20. In order to provide additional support for tube 11 an L-shaped bracket 40 may be fixedly secured as by welding to the upper end of tube 11 and which bracket may be apertured at its upper end to receive one of the handles 42 of the drill 21 therethrough. Not only does this bracket assist in securing the tube 11 and the drill 21 together, but it also serves to oppose any torque that might tend to move the drill and the tube 11 relative to each other.

Fixedly secured at spaced points along the length of tube 11 are at least two arms; an upper arm generally designated 45 and a lower arm generally designated 46. These arms extend laterally outwardly as best seen in FIG. 1 and serve to support the tube 11 on an elongated vertically extending anchor rod generally designated 50. This anchor rod is formed at its lower end with a lag screw thread indicated at 51 and a circular plate 52 which may be fixedly secured to the anchor member 50 by welding. The anchor member 50 may be formed from a bar of about one inch in diameter and is provided at its upper end 55 with threads as indicated, the lower end of the threaded portion being provided with a nut 56 which acts as a stop.

At the upper end of anchor member 50 the same is provided with a nut 57 fixedly secured as by welding to the upper threaded portion 55.

The arms 45, 46 are substantially identical and only the lower arm 46 is shown in detail in FIG. 3. These arms may be made similar to connecting rods with the smaller diameter end 60 of arm 46 being provided with a bearing 61 for rotatably supporting the anchor member 50 therein. The only difference between arms 45, 46 is that the smaller portion 65 of arm 45 is internally threaded to threadedly receive the complementarily threaded upper portion 55 of anchor member 50.

Both arms 45, 46 are provided with eccentric portions 67 for receiving tube 11 therethrough. Said arms are provided with bolt 68 and nut 69 for tightening the arms on the eccentric portions 67.

From the above described structure it will be seen that, with the arm 45 in engagement with the upper nut 57 the lower end of anchor bar 50 may be threadedly secured within the upper end of pile 10 along the central axis of the latter by turning the fixed nut 57 with a wrench. When the lower plate 52 engages the upper end of the pile 10 an extremely sturdy but removable support is provided. The drill 21 may then be started and moved in an orbital path around the anchor bar 50. As the drill is so moved the threads on upper portion 55 of the anchor bar cause the drill and its associated cutter 13 to be fed downwardly along the pile 10 to cut the latter as indicated in FIG. 1. To permit radial and axial cutting of the pile the cutter 13 is preferably of the type indicated in FIG. 4 wherein the hardened cutter blades 70 are imbedded in the cutter body so as to provide opposite axial cutting surfaces 71, 72 and a radial cutting surface 73.

From FIG. 1 it will be seen that the cutting may be continued for a predetermined distance along the pile 10 equivalent to the spacing between the nuts 56, 57. Since these nuts act as stops it will be seen that all cut piles may be cut not only to the same diameter but to the same length of cut.

If the blades of the cutter 13 become worn or reduced in size by sharpening, the eccentric 67 permits the anchor bar 50 and the tube 11 to be moved slightly relative to each other so that all piles may be cut to a uniform diameter. This same adjustment may also be used to change diameters to suit the internal diameter of the tube to be added.

It will be apparent that the disclosed apparatus can also be employed on a pile of square cross section.

I claim:

1. Apparatus for reducing the lateral extent or diameter of the top portion of a submerged pile comprising:
    a vertically disposed elongated tube adapted to be positioned with its upper end above water level and its lower end below water level.
    a pile cutter at the lower end of said tube,
    an elongated shaft rotatably supported within said tube and connected to said cutter at its lower end,
    motor means mounted on the upper end of said tube for driving said shaft,
    an elongated vertically extending anchor member adapted to be secured at its lower end to the upper end of said pile,
    means connecting said tube to said anchor member permitting orbital movement of said tube and cutter about said pile, and
    means permitting vertical movement of said last mentioned means and said tube, shaft and motor means automatically as a unit relative to said anchor member during said orbital movement.

2. Apparatus according to claim 1 wherein said last mentioned means includes an arm fixedly secured to said tube and rotatably supported on said anchor member.

3. Apparatus according to claim 2 wherein said arm is threadedly secured to said anchor member for feeding said tube vertically during said orbital movement.

4. Apparatus according to claim 2 wherein the connection between said arm and said tube includes an eccentric to permit changing the effective radius of swing of said tube about said anchor member.

* * * * *